United States Patent [19]

Minematsu et al.

[11] Patent Number: 4,684,313
[45] Date of Patent: Aug. 4, 1987

[54] WRIST DEVICE OF INDUSTRIAL ROBOT

[75] Inventors: Yoshihiko Minematsu; Minoru Tanaka; Masayuki Yamamoto; Kenichiro Sakamoto, all of Fukuoka, Japan

[73] Assignee: Mitsubishi Denki Kabushiki Kaisha, Tokyo, Japan

[21] Appl. No.: 714,207

[22] PCT Filed: Sep. 11, 1984

[86] PCT No.: PCT/JP84/00435
§ 371 Date: Mar. 14, 1985
§ 102(e) Date: Mar. 14, 1985

[87] PCT Pub. No.: WO85/03024
PCT Pub. Date: Jul. 18, 1985

[30] Foreign Application Priority Data

Jan. 13, 1984 [JP] Japan ................................. 59-5065
Jan. 13, 1984 [JP] Japan ................................. 59-5066
Jan. 13, 1984 [JP] Japan ................................. 59-5067
Jan. 13, 1984 [JP] Japan ................................. 59-5068
Jan. 25, 1984 [JP] Japan ................................ 59-13722
Jan. 26, 1984 [JP] Japan ................................ 59-12972

[51] Int. Cl.$^4$ ............................................. B25J 17/02
[52] U.S. Cl. ............................... 414/735; 74/606 R; 901/26; 901/28; 901/29
[58] Field of Search .............. 414/735, 744 A, 751; 901/25, 26, 27, 28, 29; 74/606 R, 417, 423, 424, 640

[56] References Cited

U.S. PATENT DOCUMENTS

| 2,756,614 | 7/1956 | Kobayashi | 74/606 R |
|---|---|---|---|
| 3,196,713 | 7/1965 | Robinson | 74/640 |
| 3,739,923 | 6/1973 | Totsuka | 901/29 X |
| 3,826,383 | 7/1974 | Richter | 901/26 X |
| 3,922,930 | 12/1975 | Fletcher et al. | 901/27 X |
| 4,020,715 | 5/1977 | Sollars | 74/606 R |
| 4,112,786 | 9/1978 | Thomas | 74/606 R |
| 4,507,046 | 3/1985 | Sugimoto et al. | 414/735 |

FOREIGN PATENT DOCUMENTS

| 0072624 | 2/1983 | European Pat. Off. . | |
|---|---|---|---|
| 0080416 | 6/1983 | European Pat. Off. . | |
| 0080325 | 6/1983 | European Pat. Off. . | |
| 2927485 | 1/1981 | Fed. Rep. of Germany | 901/28 |
| 1565730 | 4/1980 | United Kingdom . | |
| 2116142 | 9/1983 | United Kingdom . | |
| 2139593 | 11/1984 | United Kingdom . | |

Primary Examiner—L. J. Paperner
Assistant Examiner—Donald W. Underwood
Attorney, Agent, or Firm—Bernard, Rothwell & Brown

[57] ABSTRACT

This invention relates to an industrial robot in which a concentric triple shaft is constituted by a first drive shaft (28), a cylindrical, second drive shaft (27) which concentrically encloses the first drive shaft (28), and a cylindrical, third drive shaft (26) which concentrically encloses the second drive shaft (27). There are provided a first box member (65) capable of rotating concentrically with the third drive shaft (26), a second box member (66) which is supported rotatably by the first box member (65) on an axis intersecting the axis of rotation of the first box member (65) perpendicularly or obliquely, and an output member (80b, 100, 105) which is supported rotatably by the second box member (66) on an axis intersecting the axis of rotation of the second box member (66) perpendicularly or obliquely and which is rotated by the first drive shaft (28). A harmonic reduction unit (73, 80, 106) is disposed in at least one of the transmission systems of power to the first and second box members and the output member. A bearing box (126, 137) is provided which is disposed around gears (58, 59) of gear groups constituting transmission systems of power to the first and second box members and the output member and which is mounted within an opening (66d) formed in the box member (66), the opening (66d) of the box member (66) being larger in diameter than the outer peripheral portion of the gears (58, 59).

4 Claims, 16 Drawing Figures

WRIST DEVICE OF INDUSTRIAL ROBOT

FIELD OF ART

The present invention relates to improvements in industrial robots and more particularly to a device for driving a wrist of an industrial robot.

BACKGROUND ART

Heretofore, as this type of device there has been such device as shown in FIGS. 1 to 3. In the figures, the numeral 1 is a first servomotor; 2 is a second servomotor; 3 is a third servomotor; 4 is a pulley which is fixed to an output shaft of the first servomotor 1; 5 is a belt for transmitting the rotation of the pulley 4 to a pulley 6; 7 is a box member; 8 is a pulley fixed to an output shaft of the second servomotor 2; 9 is a belt for transmitting the rotation of the pulley 8 to a pulley 10; 62 is a box member; 11 is a pulley fixed to an output shaft of the third servomotor 3; 12 is a belt for transmitting the rotation of the pulley 11 to a pulley 13; 63 is a box member; 14 and 16 are bevel gears which are fixed to the pulleys 6 and 10, respectively; 15 and 17 are bevel gears which are in mesh with the gears 14 and 16, respectively; 18, 19 and 20, 21 are bearings which support the pulley 6, bevel gear 14 and pulley 10, bevel gear 16, respectively; 26, 27 and 28 are drive shafts for transmission of the rotations of the bevel gear 15, bevel gear 17 and pulley 13, respectively; 22, 23 and 33 are bearings which support the drive shaft 28; 24, 32 and 25, 34 are bearings which support the drive shafts 26 and 27, respectively; 31 is a second link which encloses the drive shafts 26–28, etc.; 29 and 30 are bearings which support the second link 31; 64 is a first link which supports the second link 31 at one end thereof; 65 is a first box member fixed to a below-described internal gear 37; 35 is a bearing which supports the first box member 65 rotatably; 36 is a spur gear fixed to the drive shaft 26; 37 is an internal gear which is in mesh with the spur gear 36; 38 is a spur gear fixed to the drive shaft 27; 39 is a cylindrical spur gear which is in mesh with the spur gear 38; 40 is a bevel gear fixed to the spur gear 39; 41 and 42 are bearings which support the spur gear 39 and bevel gear 40; 43 is a bevel gear which is in mesh with the bevel gear 40; 48 is a pulley fixed to a boss portion of the bevel gear 43; 44 and 45 are bearings which support the bevel gear 43 and pulley 48; 46 is a bevel gear fixed to the drive shaft 28; 47 is a bevel gear which is in mesh with the bevel gear 46; 49 is a belt for transmitting the rotation of the pulley 48 to a pulley 50; 51 is a pulley fixed to a boss portion of the bevel gear 47; 52 is a belt for transmitting the rotation of the pulley 51 to a pulley 53; 66 is a second box member fixed to a boss portion of the pulley 50; 56 and 57 are bearings which support the pulley 50 and second box member 66 rotatably; 58 is a bevel gear fixed to the pulley 53; 59 is a bevel gear which is in mesh with the bevel gear 58, 59a is an output shaft constituting an output member which is fixed to the bevel gear 59; 60 and 61 are bearings which support the bevel gear 59 and output shaft 59a rotatably; 54 and 55 are bearings which support the pulley 53 and bevel gear 58; and 67 is a bearing which supports the box member 66. The spur gear 36, internal gear 37, first box member 65, etc. constitute a first device; the spur gears 38, 39, bevel gears 40, 43, pulleys 48, 50, second box member 66, etc. constitute a second device; the bevel gears 46, 47, pulleys 51, 53, bevel gears 58, 59, output shaft 59a, etc. constitute a third device.

The axis of rotation of the first box member 65 of the first device and that of the second box member 66 of the second device are orthogonal to each other, and the axis of rotation of the second box member 66 and that of the output shaft 59a of the third device are orthogonal to each other. The numeral 68 is a fourth servomotor with a reduction unit for driving the second link 31 through an eighth link 70 and a fourth link 71; 69 is a fifth servomotor with a reduction unit for driving the first link 64 on the side opposite to the fourth servomotor 68; and 72 is a pedestal which supports the first link 64 rotatably.

Operation will now be explained. The rotation of the first servomotor 1 is transmitted to the drive shaft 26 while undergoing deceleration and axial change successively through pulleys 4, 6 and bevel gears 14, 15, then slowed down by the spur gear 36 and internal gear 37 and causes the first box member 65 to rotate, whereby the operation of the first device is performed. Next, the rotation of the second servomotor 2 is transmitted to the drive shaft 27 while undergoing deceleration and axial change successively through pulleys 8, 10 and bevel gears 16, 17, then undergoes further deceleration and axial change through the spur gears 38, 39 and bevel gears 40, 43, and causes the second box member 66 to rotate through pulleys 48 and 50, whereby the operation of the second device is performed. The rotation of the third servomotor 3 is slowed down through pulleys 11 and 13 and transmitted to the drive shaft 28, then undergoes deceleration and axial change successively through bevel gears 46, 47, pulleys 51, 53 and bevel gears 58, 59, and causes the output shaft 59a to rotate, whereby the operation of the third device is performed.

The first and second devices, and the second and third devices, rotate about intersecting axes respectively. With the first to third devices, a work (not shown) secured to the output shaft 59a performs a so-called three-freedom wrist operation. Further, the rotation of the fourth servomotor causes the second link 31 to rotate through the fourth link 71 and third link 70, and the fifth servomotor 69 rotates the first link 64. The industrial robot combines the operations of the second link 31 and first link 64 which are performed by the fourth and fifth servomotors 68 and 69 and associated drive systems, with the above wrist operation and effects a five-freedom operation.

The first device which comprises the spur gear 36, internal gear 37, first box member 65, etc. is orthogonal to the axis of the second device which comprises the spur gears 38, 39, bevel gears 40, 43, pulleys 48, 50, second box member 66, etc. The second device is orthogonal to the axis of the third device which comprises the bevel gears 46, 47, pulleys 51, 53, bevel gears 58, 59, output shaft 59a, etc. For effecting the three-freedom wrist operation, it is necessary to use a large number of pulleys, spur gears, bevel gears and bearings. As a result, not only the number of components increases, but also the accuracy may be reduced by an accumulated error of each component. Besides, the wrist portion becomes more complicated and its weight increases, thus requiring increase in strength of each link which supports the wrist portion, and hence an increase in size of the system.

FIG. 4 is a sectional view of another conventional device which is disclosed, for example, in Japanese Patent Laid Open Publication No. 105463/77. In the figure, the numeral 31 is a cylindrical link; 28 is a first drive shaft disposed within the link 31; 27 is a cylindrical, second drive shaft which concentrically encloses the first drive shaft 28; 26 is a cylindrical, third drive shaft which concentrically encloses the second drive shaft 27; 65 is a first box member coupled to one end of the third drive shaft 26 and adapted to rotate concentrically therewith, one end of the first box member 65 being formed with a side plate 65b having a central support portion 65a which is located on an axis obliquely intersecting the axis of rotation of the first box member 65. The numeral 66 is a second box member having a cylindrical portion 66a which is rotatably supported by the support portion 65a, one end of the second box member 66 being formed with a support portion 66b which is located on an axis obliquely intersecting the axis of rotation of the second box member 66. The numeral 40 is a gear coupled to the second drive shaft 27; 49A is a gear shaf which is supported by the first box member 65 and which is in mesh with the gear 40; 43 is a gear which is in mesh with the gear shaft 49A and coupled to the cylindrical portion 66a of the second box member 66; 46 is a gear coupled to the first drive shaft 28; 47 is a gear which is in mesh with the gear 46 and concentric with the cylindrical portion 66a; 52A is a transmission shaft which is coupled to the gear 47 at one end thereof and disposed concentrically within the cylindrical portion 66a; 58 is a gear coupled to one end of the transmission shaft 52A; 59 is an output gear which is located on an axis obliquely intersecting the transmission shaft 52A and which is in mesh with the gear 58; and 100 is an output member such as a gripper or the like which is coupled to the output gear 59 and supported rotatably by the support portion 66b.

In the above construction, first, with rotation of the third drive shaft 26, the first box member 65 rotates about the axis of rotation, α, of the third drive shaft 26. Next, with rotation of the second drive shaft 27, the second box member 66 rotates about the axis of rotation, β, via gear 40→gear shaft 49 A→gear 43→cylindrical portion 66a. Then, with rotation of the first drive shaft 28, the output member 100 rotates about the axis of rotation, γ, via gear 46→gear 47→transmission shaft 52A→gear 58→output gear 59. In this way, the output member 100, namely the gripper, performs a three-dimensional operation. For rotation of the second box member 66, a large rotational force is generally required in comparison with the output member 100. Therefore, the output member 100 is rotated by the first drive shaft 28 of a smaller diameter as well as the transmission shaft 52A, and the second box member 66 is rotated by the second drive shaft 27 of a larger diameter as well as the cylindrical portion 66a.

However, since the gear 43 is positioned on the side of an intersecting point of the axes α and β with respect to the gear 47, the gears 40 and 43 are interconnected through the gear shaft 49A which constitutes an intermediate gear not contributing to deceleration. At a reduction ratio of the gears 40 and 43 it is impossible to expect a large increase in torque. Therefore, it is necessary that the input side of the second drive shaft 27 be set at a high torque in advance. This high torque is transmitted to the cylindrical portion 66a, namely the second box member 66, through the second drive shaft 27, gear 40, gear shaft 49A and gear 43. Accordingly, the strength of this transmission system must be set high with the result that not only the diameter of each shaft, gear tooth thickness, etc. increase, but also a rotational backlash of the first box member 65 relative to the link, that of the second box member 66 relative to the first box member 65 and that of the output member relative to the second box member 66 become larger due to accumulation of backlash of each gear, thus leading to deterioration in the operation accuracy of the output member 100.

Moreover, since the second box member is supported only at its cylindrical portion by the first box member, deflections would occur in the vicinity of the output member. Also in this respect, a bad influence is exerted on the operation accuracy of the output member.

As a still another conventional device of this type there is, for example, such device as disclosed in Japanese Patent Laid Open Publication No. 83265/78. This device is provided with three concentric shafts, to one of which is coupled a first box member adapted to rotate concentrically therewith. Supported rotatably by the first box member is a second box member, which is driven directly by a bevel gear coupled to another shaft in the triple shaft. More particularly, the second box member is directly formed with a gear which is in mesh with the above bevel gear, so it is rotated by the above bevel gear directly without intervention of an intermediate transmission shaft. By the way, as well known, the industrial robot is used for assembling, welding and like operations, for which a high operation accuracy is required. In assembling, therefore, the engagement of bevel gears should be adjusted. But, in a device in which a bevel gear is coupled to a second box member, the second box member itself must be handled together with the bevel gear for adjusting the engagement of the latter, thus resulting in a reduced working efficiency and need of much labor.

DESCRIPTION OF THE INVENTION

The present invention provides a wrist device of an industrial robot in which a concentric triple shaft is constituted by a first drive shaft, a cylindrical, second drive shaft which concentrically encloses the first drive shaft and a cylindrical, third drive shaft which concentrically encloses the second drive shaft, and there are provided a first box member capable of rotating concentrically with the third drive shaft, a second box member rotatably supported by the first box member on an axis which intersects the axis of rotation of the first box member perpendicularly or obliquely, and an output member which is rotatably supported by the second box member to have an axis perpendicularly or obliquely intersecting the axis of rotation of the second box member and which is rotated by the first drive shaft, and a harmonic reduction unit is disposed in at least any one of transmission systems of power to the first and second box members and the output member, whereby it is possible to make the components of the power transmission systems small, reduce backlash in the rotational directions of rotating members such as the first and second box members and the output member and improve the operation accuracy of the output member.

The present invention also provides a wrist device of an industrial robot in which a concentric triple shaft is constituted by a first drive shaft, a cylindrical, second drive shaft which concentrically encloses the first drive shaft and a cylindrical, third drive shaft which concentrically encloses the second drive shaft, and there are provided a first box member capable of rotating concentrically with the third drive shaft, a second box member supported rotatably by the first box member on an axis which intersects the axis of rotation of the first box member perpendicularly or obliquely, an output member which is rotatably supported by the second box member to have an axis perpendicularly or obliquely intersecting the axis of rotation of the second box member and which is rotated by the first drive shaft, and a bearing box which is disposed over the outer periphery of a gear of gear group constituting transmission systems of power to the first and second box members and the output member and which is disposed within an opening formed in the box members, said opening being larger in diameter than the outer peripheral portion of said gear.

BEST FORM FOR PRACTICING THE INVENTION

Figure 1:
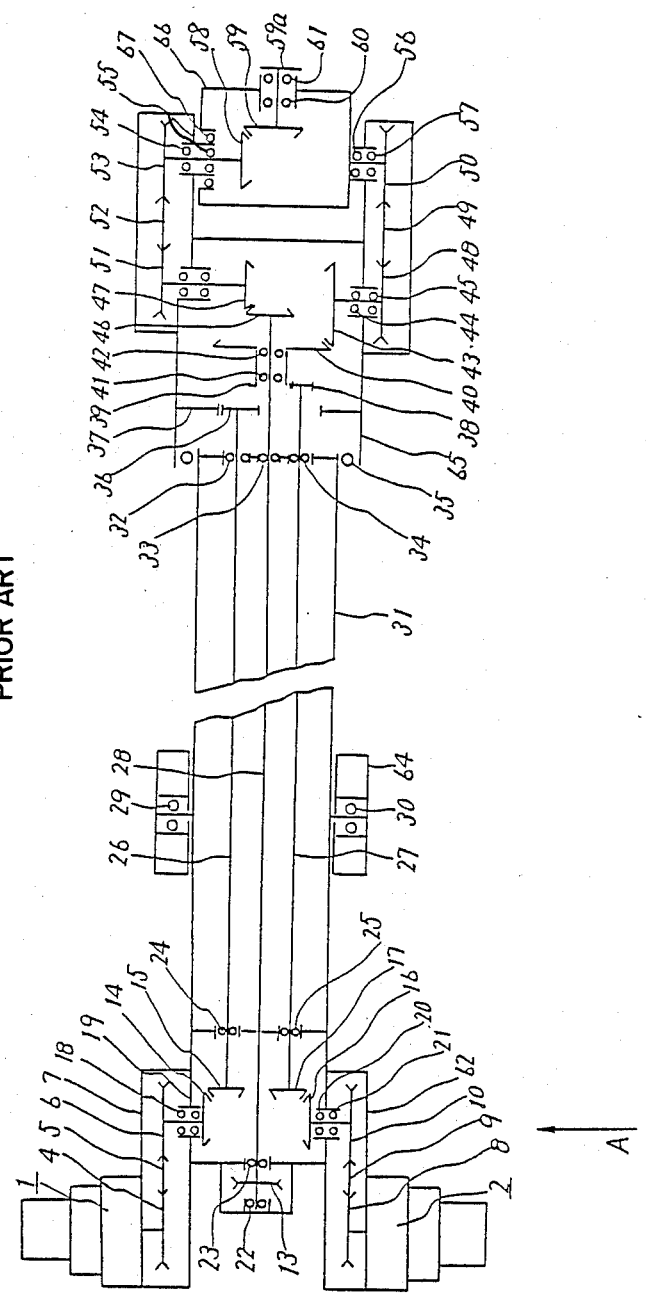
FIG. 1 is a partially sectional plan view of a conventional device for driving a wrist portion of an industrial robot.
Figure 2:
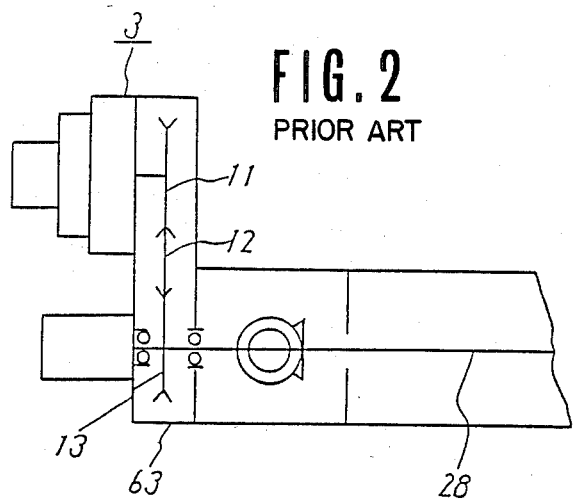
FIG. 2 is a partially sectional side view in the direction of arrow A of FIG. 1.
Figure 3:
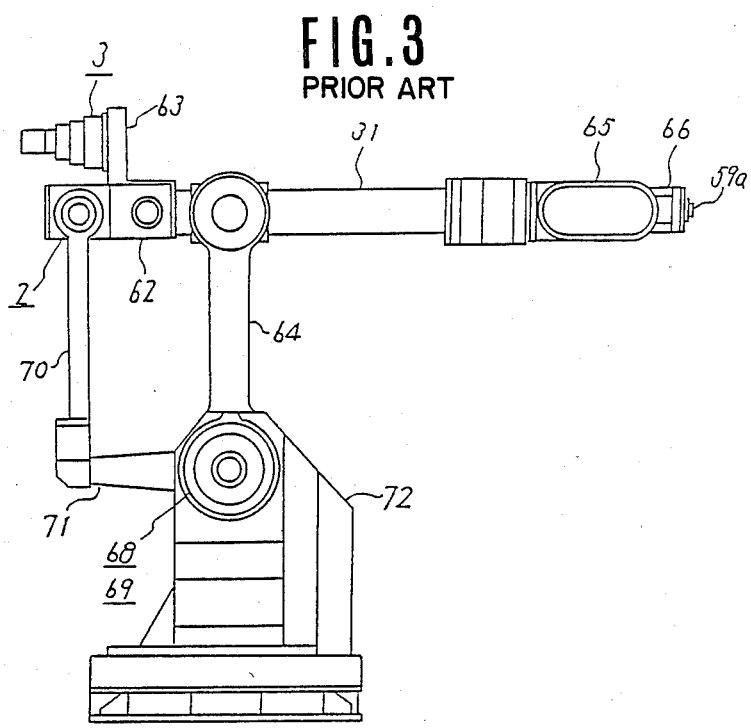
FIG. 3 is an entire side view of a conventional industrial robot having the device of FIG. 1.
Figure 4:
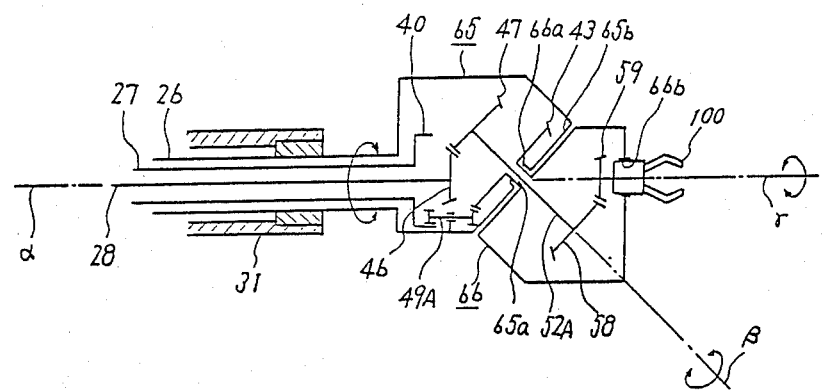
FIG. 4 is a sectional view of a principal portion showing another conventional device.
Figure 6:
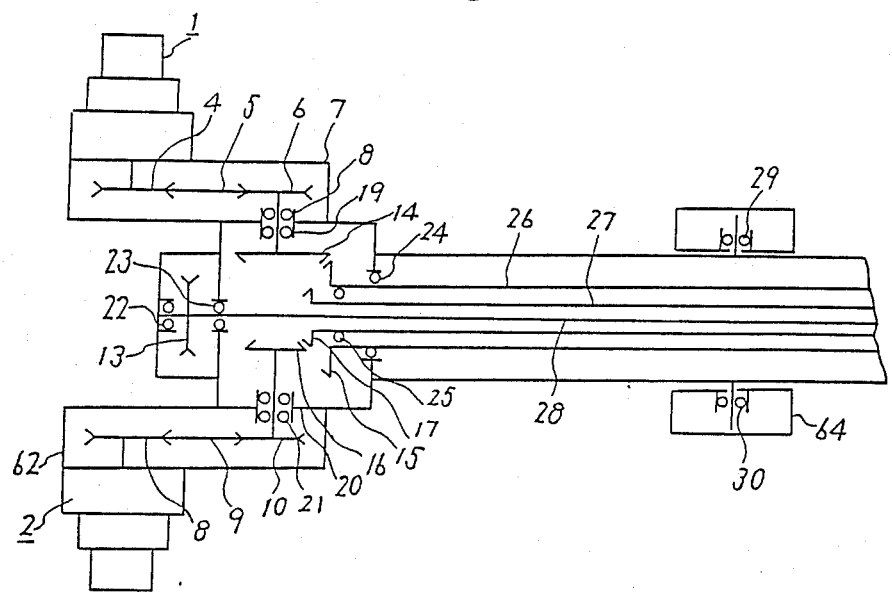
FIG. 6 is a partially sectional plan view in the direction of arrow B of FIG. 5.
Figure 5:
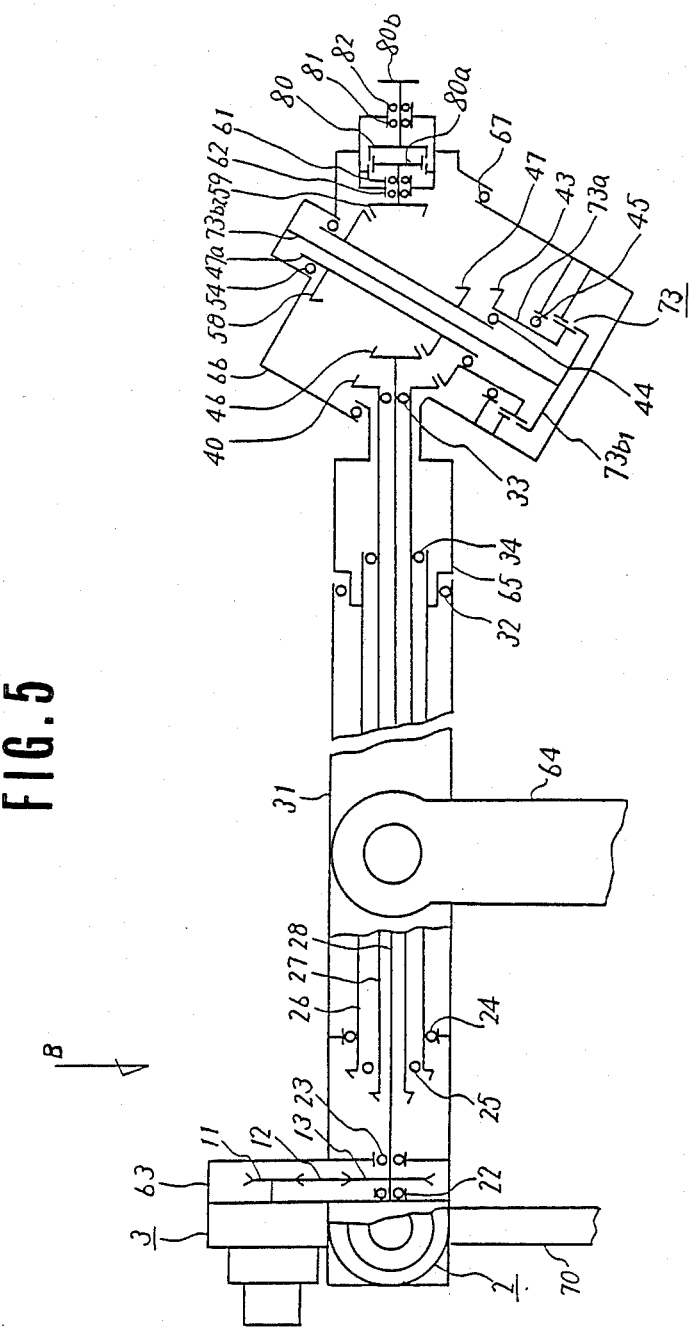
FIG. 5 is a partially sectional side view showing a wrist device of an industrial robot in one embodiment of the present invention.
Figure 7:
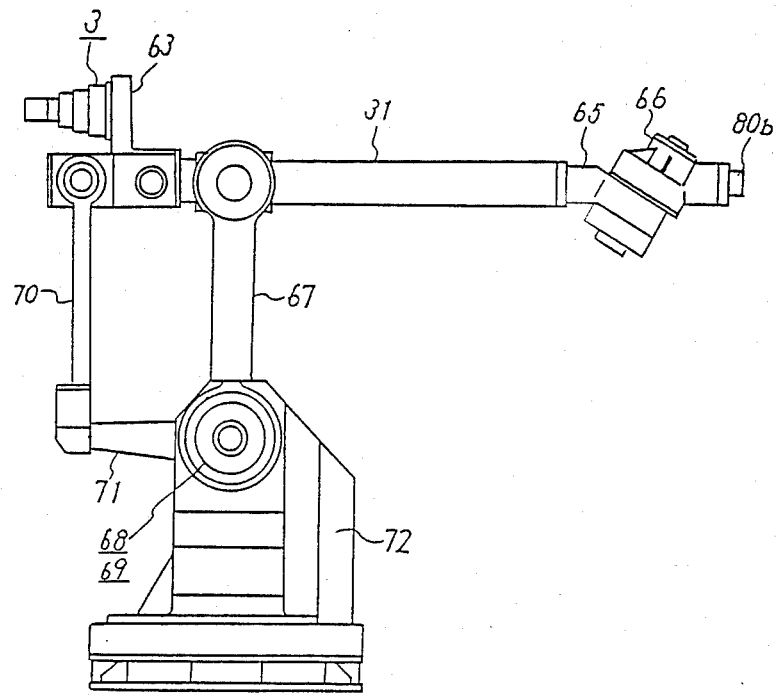
FIG. 7 is an entire side view of an industrial robot having the device of FIG. 5.

An embodiment of the present invention will now be explained with reference to the drawings. In FIGS. 5 to 7, the numerals 26, 27 and 28 are drive shafts for transmission of the rotation of a bevel gear 15, a bevel gear 17 and a pulley 13, respectively. Within the drive shaft 26 is disposed the drive shaft 27 which is hollow, and within the hollow drive shaft 27 is disposed the drive shaft 28, thus constituting a triple shaft. The numerals 24, 32 and 25, 34 are bearings which support the hollow drive shafts 26 and 27, respectively, and the numeral 65 is a first box member which is fixed to the drive shaft 26 and which is rotatably supported by the bearing 32. The numeral 40 is a bevel gear fixed to the drive shaft 27; 43 is a bevel gear which is in mesh with the bevel gear 40 on an axis obliquely intersecting the axis of rotation of the bevel gear 40; 44 is a bearing which supports the bevel gear 43; 73 is a harmonic reduction unit (hereinafter referred to as "reduction unit"); and 73a is an input shaft of the reduction unit 73, the input shaft 73a being formed hollowly and fixed to the bevel gear 43. The numerals 73b1 and 73b2 constitute an output shaft and a transmission shaft of the reduction unit 73, the transmission shaft 73b2 extending coaxially through the input shaft 73a. The numeral 66 is a second box member fixed to the transmission shaft 73b2; 67 is a bearing which supports the second box member 66 rotatably; 46 is a bevel gear fixed to the drive shaft 28; 47 is a bevel gear which is in mesh with the bevel gear 46 concentrically with the bevel gear 43; 47a is a hollow shaft fixed to the bevel gear 47; 58 is a bevel gear coupled to one end of the shaft 47a; 59 is a bevel gear which is in mesh with the bevel gear 58 concentrically with the bevel gear 46; 80 is a harmonic reduction unit having an input shaft 80a to which is coupled the bevel gear 59; 80b is an output shaft which serves not only as an output part of the harmonic reduction unit 80 but also as an output part of the wrist portion; 81 and 82 are bearings which support the output shaft 80b. The numeral 45 is a bearing which supports the input shaft 73a; 54 is a bearing which supports the shaft 47a together with the bevel gear 58; 61 and 62 are bearings which rotatably support a boss portion of the bevel gear 59. The first box member, etc. constitute a first device; the bevel gears 40, 43, the shaft 43a, the second box member 65, etc. constitute a second device; and the bevel gears 46, 47, 58, 59, the harmonic reduction unit 80, the output shaft 80b, etc. constitute a third device.

The axis of rotation of the first box member 65 of the first device and that of the second box member 66 of the second device intersect at a predetermined angle of inclination, and the axis of rotation of the second box member 66 and that of the output shaft 30b of the third device also intersect at a predetermined angle of inclination. Explanation of the other reference numerals will be omitted because they are the same as in the conventional device.

In the above construction, the rotation of the first servomotor is transmitted to the drive shaft 26 while undergoing deceleration and axial change successively through pulleys 4, 6 and bevel gears 14, 15, and causes the first box member 65 to rotate, whereby the operation of the first device is performed. The rotation of the second servomotor 2 is transmitted to the drive shaft 27 while undergoing axial change successively through pulleys 8, 10 and bevel gears 16, 17, then further undergoes axial conversion through bevel gears 40 and 43, passes the bevel gear 43 and further the input shaft 73a and is slowed down by the reduction unit 73, then rotates through the output shaft 73b1 the second box member 66 which is fixed to the transmission shaft 73b2, whereby the operation of the second device is carried out. The rotation of the third servomotor 3 is slowed down through pulleys 11 and 13, transmitted to the drive shaft 28, then undergoes deceleration and axial change successively through bevel gears 46, 47, 58 and 59 and rotates the harmonic reduction unit fixed to the bevel gear 59, and further the output shaft 80b, whereby the operation of the third device is effected.

The first, second and third devices rotate about axes which intersect at predetermined angles of inclination. With the first to third devices, a work (not shown) fixed to the output shaft 80b performs a so-called three-freedom wrist operation. Further, by virtue of rotation of the fourth servomotor 68 and fifth servomotor 69, the second and first links 31 and 64 rotate in the same fashion as in the conventional device, and thus the industrial robot performs a five-freedom operation in combination with the above wrist operation.

Since the harmonic reduction unit 80 is constituted at a high reduction ratio and with an extremely small backlash, the bevel gears 46, 47, 58 and 59 leading to the input shaft 80a as well as the drive shaft 28 and the shaft 47a transmit an extremely low torque. Moreover, the backlash of these transmission systems is almost negligible because the backlash of the harmonic reduction unit 80 is extremely small and the reduction ratio thereof is extremely high.

Although in the above description there has been explained an industrial robot having a first link 64 one end of which is rotatably supported and a second link 31 which is rotatably supported at an intermediate portion thereof by the other end of the first link 64, it goes without saying that the present invention is also applicable to known industrial robots of rectangular coordinate, polar coordinate and multi-articulated types.

According to this embodiment, as set forth above, a large number of pulleys and spur gears become unnecessary so the number of components can be reduced and it is possible to remedy an accumulated error of each component, that is, improve the accuracy of the device; besides, it is possible to reduce that weight of the wrist portion and reduce the load to the links.

In addition, since the harmonic reduction unit is disposed in the final-stage speed reduction portion of the output member, the backlash of the drive system leading to the input shaft of the harmonic reduction unit is almost negligible, and by utilizing the characteristic that the backlash of the harmonic reduction unit is extremely small, the backlash of the output member can be reduced markedly and hence the operation accuracy of the output member can be improved to a remarkable extent.

Further, since the shafts and gears of the transmission system leading to the harmonic reduction unit may transmit only a low torque, it is possible to attain the reduction in size of the shafts and gears.

Figure 8:
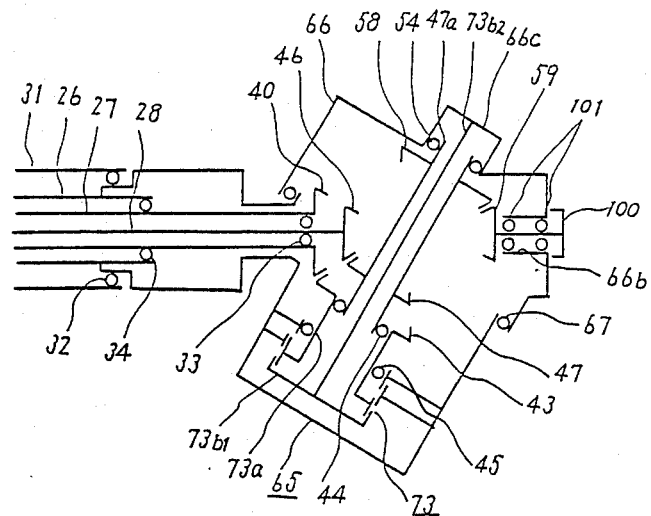
FIGS. 8 to 12 are sectional side views showing another embodiment of the present invention.

FIG. 8 shows another embodiment of the present invention, in which the numerals 33, 34, 32 and 67 are bearings which rotatably support the first drive shaft 28, second drive shaft 27, first box member 65 and second box member 66, respectively; 47 is a gear engaged with the box member 46; 47a is a cylindrical shaft to one end of which is coupled the gear 47 and which obliquely intersects the axis of rotation of the first box member 65; 54 is a bearing which is supported by the second box member 66 and which rotatably supports the other end of the cylindrical shaft 47a; and 58 is a gear which is coupled to the other end of the cylindrical shaft 47a and which is in mesh with an output gear 59. The numeral 43 is a gear engaged with a gear 40, and 73 is a harmonic reduction unit having an input shaft 73a coupled to the gear 43 and also having an output portion 73b1. The numeral 73b2 is a transmission shaft coupled at one end thereof to the output portion 73b1 and at the other end to a bottom portion 66c of a second box member 66, the transmission shaft 73b2 being disposed concentrically within the cylindrical shaft 47a. The numeral 45 is a bearing which supports the input shaft 73a of the harmonic reduction unit 73; 44 is a bearing which is supported by the gear 43 and which supports the cylindrical shaft 47a rotatably; and 101 represents a pair of bearings which are supported by a bearing portion 66b of the second box member 66 and which support an output member 100 rotatably.

In the above construction, the rotation of the third drive shaft 26 is transmitted to the first box member; the rotation of the second drive shaft 27 is transmitted to the second box member 66 via gear 40→gear 43→harmonic reduction unit 73→transmission shaft 73b2; and the rotation of the first drive shaft 28 is transmitted to the output member 100 via gear 46→gear 47→cylindrical shaft 47a→gear 58→output gear 59. As a result, the output member 100 is operated in three dimensions. The gears 40 and 43 in the transmission system of the second box member 66 are positioned on the side opposite to the point of intersection of the axis of the transmission shaft 73b2 and cylindrical shaft 47a and the axis of rotation of the first box member 65, and the input shaft 73a of the harmonic reduction unit 73 is coupled to the gear 43, so the mounting space of the harmonic reduction unit 73 having a high reduction ratio can be ensured freely, and desired reduction ratio and torque are transmitted to the second box member 66 through the transmission shaft 73b2. Therefore, the gears and shafts of the transmission system leading to the input shaft 73a of the harmonic reduction unit 73 can transmit rotation in a state of low torque.

Moreover, the output member 100 which is maintained at a relatively low torque is driven by the first drive shaft 28 of a small diameter, and the drive shafts 26, 27 and 28 transmit torques matching the respective shaft strengths.

In this embodiment, as set forth above, each drive shaft can transmit a torque which matches its shaft strength based on its diameter. This is very efficient. Besides, in the transmission system of the second box member, the harmonic reduction unit is the final reduction portion, so the drive shaft and the gears can effect a low torque transmission, thus permitting reduction of their size. Further, since the harmonic reduction unit is the final-stage reduction portion as mentioned above, the characteristics of the harmonic reduction unit, namely, a high reduction ratio and an extremely small backlash, can be utilized. That is, even if the backlash of the gears, etc. leading to the input shaft of the harmonic reduction unit is large, it is almost negligible. Consequently, the backlash in the rotational direction of the second box member can be made extremely small and the operation accuracy of the output member can be greatly improved.

Further, in a construction in which the input shaft of the harmonic reduction unit and bevel gear are coupled together and the bevel gear and input shaft are supported by a bearing, it becomes possible to simplify the bearing means of the harmonic reduction unit.

Figure 9:
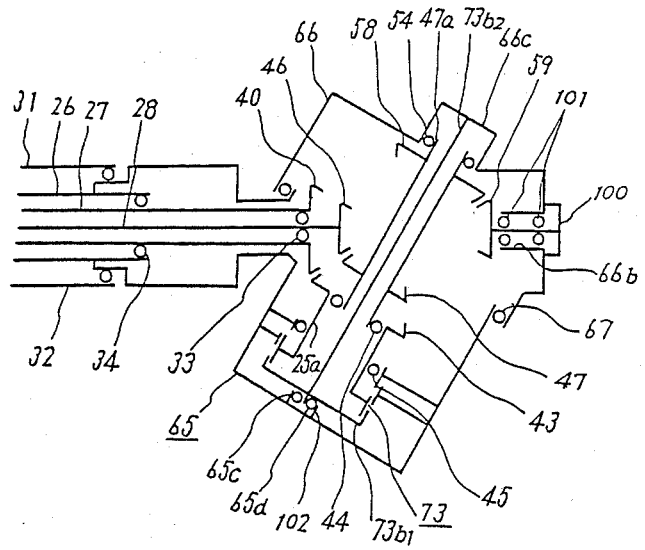

FIG. 9 shows a still another embodiment which is similar to the construction of the second embodiment of FIG. 8 except that a bearing 102 which rotatably supports the other end of the transmission shaft 73b2 is fitted in a fitting portion 65d of a cylindrical portion 65c which is concentric with the axis of rotation of the second box member 66.

In such construction, the transmission shaft 73b2 is supported at one end thereof by the first box member 65 through the second box member 66 and bearing 67, and supported at the other end thereof by the first box member 65 through the bearing 102, and the second box member 66 coupled to the transmission shaft 73b2 is prevented from being deflected by the presence of the shaft 73b2.

Thus, in this third embodiment, the deflection of the second box member relative to the first box member can be surely prevented, and the operation accuracy of the output member is improved remarkably in addition to the backlash reducing effect mentioned in connection with the second embodiment.

Figure 10:
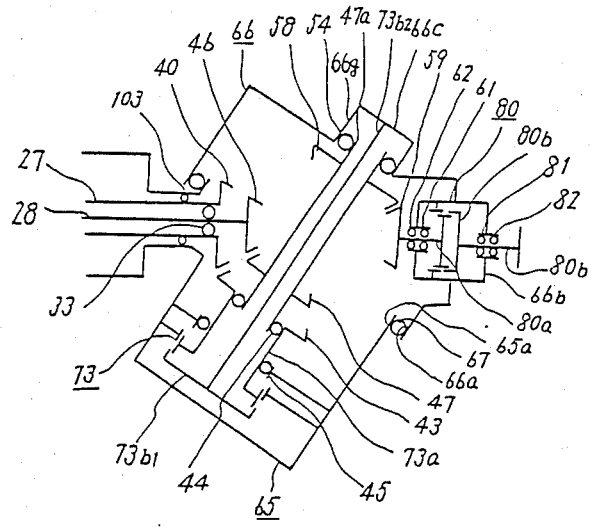

FIG. 10 shows a further embodiment similar to the first embodiment of FIG. 5 except that a bearing 103 is provided which is supported within the first box member 65 and which supports the second drive shaft 27 rotatably. The first and second box members 65 and 66 are fitted together and supported rotatably through a bearing 67 in the respective openings 65a and 66a.

Figure 11:
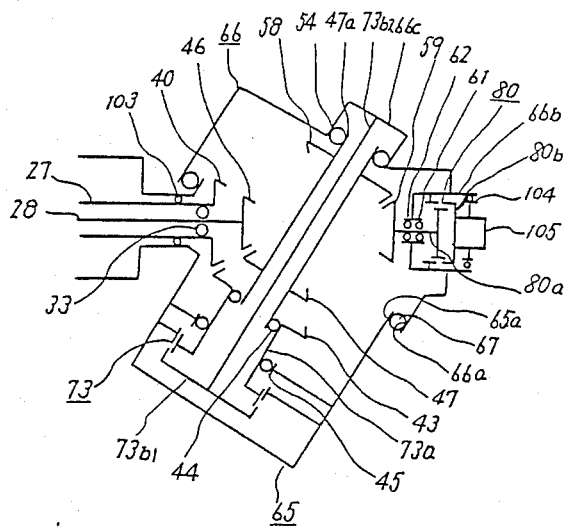

FIG. 11 shows a fifth embodiment similar to the fourth embodiment of FIG. 10 except that the construction of the output member is different, more specifically, a gripper (not shown) is attached to a boss portion 105 which is coupled to an output portion 80b, and a bearing 104 is provided which is fitted in a support portion (housing) 66b of the second box member 66 and which supports the boss portion 105 rotatably.

Figure 12:
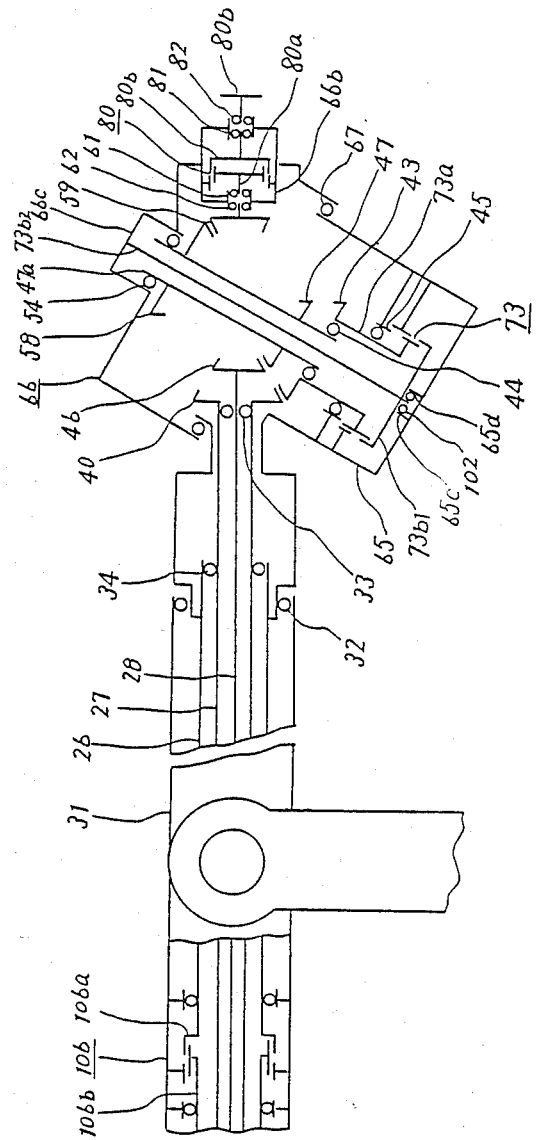

FIG. 12 is a modification of the first embodiment shown in FIG. 5. In FIG. 12, there are provided bearing 102 shown in FIG. 9 as well as a harmonic reduction unit 106 having an output portion 106a which is disposed at an input end of the third drive shaft 26 and coupled to the latter and an input shaft 106b which is coupled to a drive source (not shown). Bearings are provided for supporting the input end of the third drive shaft and the input shaft 106b of the harmonic reduction unit 106.

In the above construction, when the input shaft 106b of the harmonic reduction unit 106 is rotated by the drive source, the output portion 106a rotates in a decelerated state at a large reduction ratio, thus causing the third drive shaft 26 to rotate.

In this sixth embodiment, moreover, the harmonic reduction units 73, 80 and 106 are disposed at the final reduction stages of the transmission systems of the second box member 66, output member 80b and first box member 65, respectively. In each transmission path leading to each harmonic reduction unit, it is possible to effect transmission in a state of low torque, so the gears and shafts in each transmission path are made small in diameter. Further, since the harmonic reduction units have each an extremely large reduction ratio, the reduction ratio of each transmission path leading to each harmonic reduction unit can be set, for example, at 1:1, thus making it possible to reduce the size of each gear.

Moreover, even if the backlash in the rotational direction of each transmission path is large, it depends on the characteristic of the backlash of each harmonic reduction unit because the harmonic reduction units 73, 80 and 106 are the final reduction stages. In this connection, since the backlash of the harmonic reduction unit is very small as is well known, a relatively large backlash in each transmission path is almost negligible and so the operation characteristics of the output member 80b are greatly improved.

That is, disposing the harmonic reduction units 73, 80 and 106 at the final reduction stages of the first and second box members 65 and 66 and the output member 80b is effective particularly for robots, such as industrial robots, for which a high operation accuracy is required.

Figure 13:
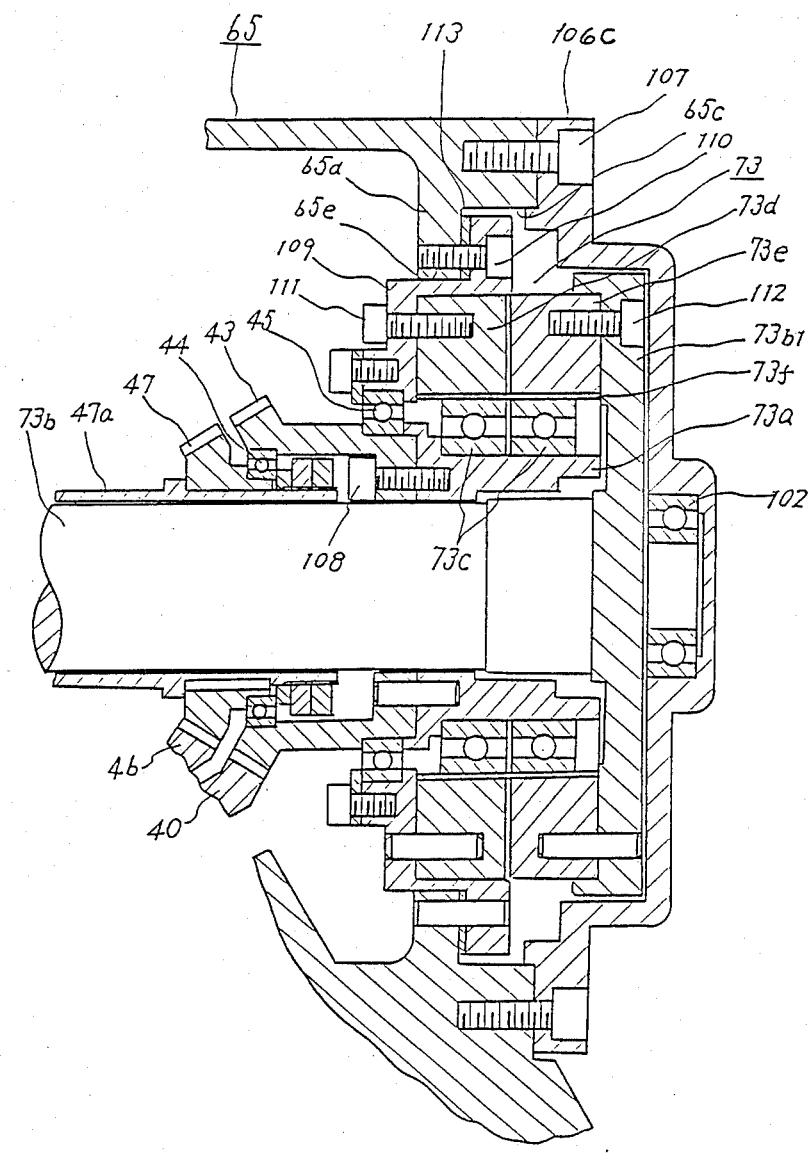
FIGS. 13 to 16 are sectional views of principal portions showing details of power transmission systems in one embodiment of the present invention.

FIG. 13 is a sectional view showing a concrete structure of and around the harmonic reduction unit 73 and bearing 102 illustrated in FIGS. 9 and 12. In the same figure, the numeral 102 is a bearing which rotatably supports the other end of the transmission shaft 73b2; 106c is a bracket which is secured to the opening (cylindrical portion) 65c of the first box member 65 removably through bolts 107 and which supports the bearing 102; 108 is a bolt for coupling the gear 43 and the input shaft 73a; and 109 is a bearing box which is fitted in a fitting portion 65e of a flange 65d and which supports the bearing 45, the bearing box 109 having a fitting portion. The numeral 110 is a bolt for coupling the bearing box 109 to the flange 65d; 73c represents a pair of elliptic bearings of the harmonic reduction unit 73; 73d is a stationary side circular spline which is fitted in the fitting portion of the bearing box 109 and which is coupled to the bearing box 109 with bolts 111; and 73e is a driving side circular spline which is disposed side by side with the circular spline 73d and which is coupled to the output portion 73b1 with bolts 112. The numeral 73f is a flex spline which engages both circular splines 73d and 73e, and 113 is an adjusting washer for adjusting backlash of the gear 43.

In such construction, the harmonic reduction unit 73 is driven in the following manner. As is well known, upon rotation of the input shaft 73a, the bearings 73c rotate elliptically and the flex spline 73f engages the stationary side circular spline 73d, thereby causing rotation of the flex spline 73f. As a result, the circular spline 73e rotates and the output portion 73b1 comes into rotation. In adjusting the backlash between the gears 43 and 40, the stationary side circular spline 73d can be removed and mounted together with the bearing box 109, thereby permitting removal and mounting of the gear 43 together with the input shaft 73a, and thus the backlash of the gear 43 is adjusted by changing the number of the adjusting washer 113.

Thus, in this embodiment, bevel gear 43 can be mounted removably in the opening of the first box member together with the harmonic reduction unit and it becomes possible to dispose the washer 113 for adjusting the backlash of the bevel gear, whereby the backlash at the front stage of the harmonic reduction unit can also be suppressed. Also in this respect, a remarkable improvement of the operation accuracy can be attained.

Figure 14:
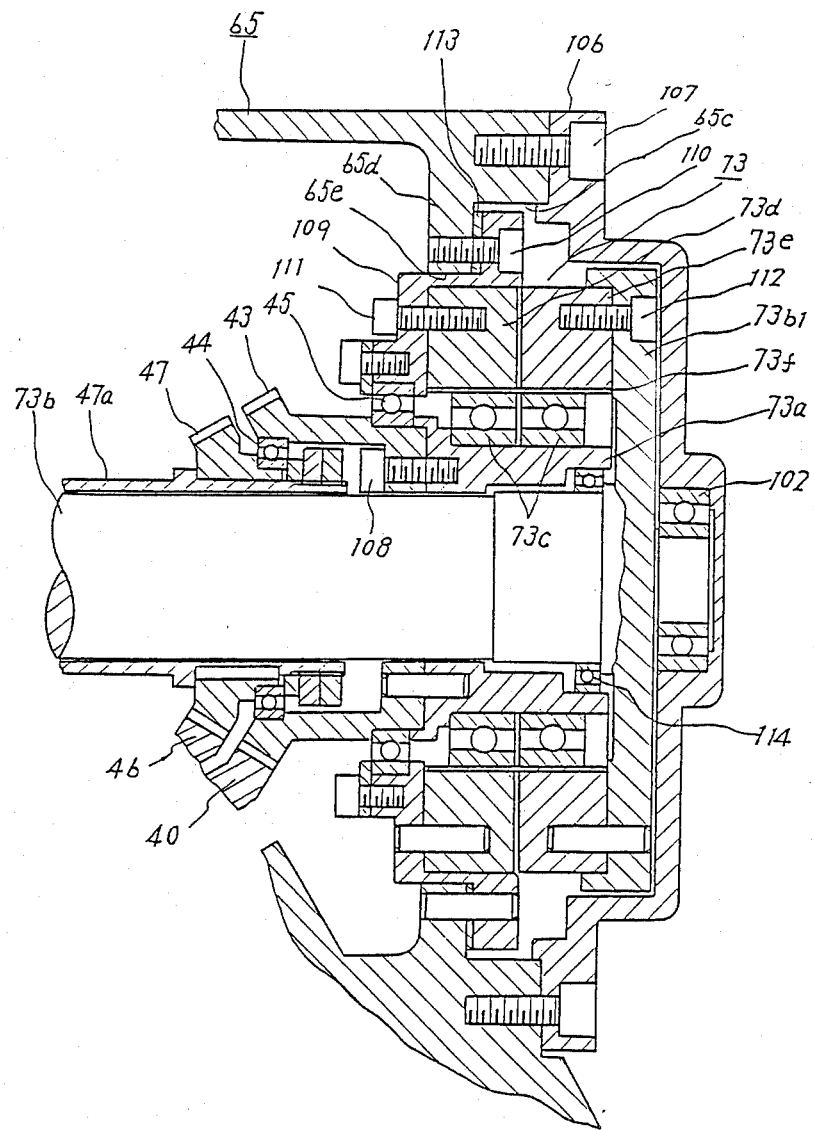

FIG. 14 is a sectional view showing another concrete example of and around the harmonic reduction unit 73 and bearing 102 similarly to FIG. 13 except that there is additionally provided a bearing 114 which supports an end portion of the transmission shaft 73b2 while being supported by the inner periphery of an end portion of the input shaft 73a of the harmonic reduction unit 73.

In such construction, since the end portion of the transmission shaft 73b2 is supported by the input shaft 73a through the bearing 114, the transmission shaft 73b2 is supported more positively by the first box member 65, and not only the transmission shaft 73b2 but also the output portion 73b1 of the harmonic reduction unit 73 is supported firmly.

Thus, in this embodiment, since the other end of the transmission shaft is supported by the input shaft of the harmonic reduction unit through a bearing, the transmission shaft can be supported positively, so it is possible to suppress deflection of the second box member and the operation accuracy of the output member is further improved remarkably.

Figure 15:
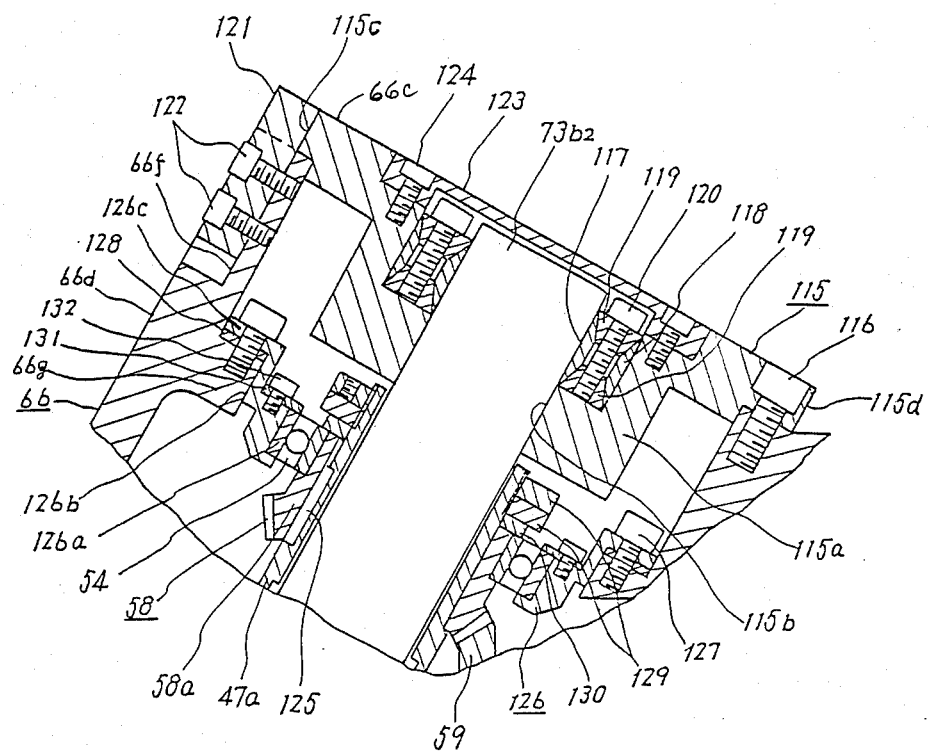

FIG. 15 is a sectional view showing a concrete structure of and around the bevel gear 58 and an end portion of the transmission shaft 73b2 in the embodiments shown in FIGS. 5 and 8 to 12. In the figure, the numeral 115 is a housing which is fitted in the cylindrical portion 66d of the second box member 66 to form a bottom portion 66c. The housing 115 has a cylindrical portion 115a and a fitting portion 115b in which is fitted the transmission shaft 73b2. The numeral 116 is a bolt which is threadedly fitted in the housing 115 to fix the latter to the cylindrical portion 66d, and 117 is a first ring-like wedge which is disposed in the cylindrical portion 115a and which is in contact with the outer periphery of the transmission shaft 73b2. The first wedge has a central part of a larger diameter and is tapered from the central part toward both ends thereof. The numeral 118 is a second ring-like wedge which is in contact with the inner periphery of the cylindrical portion 115a and which has a central part of a smaller diameter and is tapered from the central part toward both ends thereof. The numeral 119 represents a pair of third ring-like wedges which are disposed on both sides between the first and second wedges 117 and 118 and which are tapered to match the first and second wedges 117 and 118, and the numeral 120 is a bolt which extends through one of the paired third wedges 119 and is threaded into the other. The first, second and third wedges 117, 118 and 119 and the bolt 120 constitute a wedge means. When the bolt 120 is tightened, the paired third wedges 119 approach each other, so the first and second wedges 117 and 118 are brought into pressure contact with the outer periphery of the transmission shaft 73b2 and the inner periphery of the housing 115, respectively, and the transmission shaft 73b2 and the cylindrical portion 66d of the second box member 66 are coupled through the first, second and third wedges 117, 118 and 119, bolt 120 and housing 115. As to the tightening torque of the bolt 120, an adjustment is made so that only when an overload torque is applied to the transmission shaft 73b2, it is slipped by one or both of the contact surface between the first wedge 117 and the transmission shaft 73b2 and the contact surface between the second wedge 118 and the housing 115.

The numeral 115c is a key way which is formed in the outer periphery of a flange portion 115d of the housing 115 approximately in the same direction as the axial direction of the transmission shaft 73b2; 66f is a key way which is formed in the outer periphery of the cylindrical portion 66d of the second box member 66 opposedly to the key way 115c approximately in the same direction as the axial direction of the transmission shaft 73b2; 121 is a key fitted in both the key ways 115c and 66f; 122 represents a pair of bolts which are threaded to the cylindrical portion 66d to fix the key to the cylindrical portion 66d; 123 is a cover which is attached to the housing 115 through bolts 124 to cover an end portion of the housing 115; and 125 is a key extending over the inner periphery of a boss portion 58a of the bevel gear 58 and the outer periphery of the cylindrical shaft 47a. bearing 54 is fitted on the outer periphery of the boss portion 58a. The numeral 126 is a bearing box having a fitting portion 126a in which is fitted the bearing 54, a fitting portion 126b engaged with an inward flange 66g of the cylindrical portion 66d and a flange 126c opposed to an end face of the flange 66g; the numeral 127 is a bolt for fixing the bearing box 126 to the flange 66g; 128 is an adjusting washer disposed between the flanges 126c and 66g; 129 represents a pair of nuts which are threadedly engaged with an end portion of the cylindrical shaft 47a through a washer 130 to prevent the movement of the bevel gear 58; and 131 is a hold plate which is fixed to the bearing box 126 through bolts 132 to hold the bearing 54.

The inside diameter of the flange 66g is larger than the diameter of the outer peripheral portion of the bevel gear 58.

In such construction, in the event the second box member 66 should strike against an adjacent equipment or part during operation of the wrist mechanism, an extremely large overload torque is applied to the transmission shaft 73b2 which transmits the rotational force to the second box member 66. However, the first, second and third wedges 117, 118 and 119 are preadjusted so that at such overload torque the tightening torque of the bolt 120 is slipped by one or both of the contact surface between the first wedge 117 and the transmission shaft 73b2 and the contact surface between the second wedge 118 and the housing 115. Therefore, the moment such overload torque is applied to the transmission shaft 73b2, there occurs a slip at the first and second wedges 117 and 118, thereby absorbing the impact force induced by the overload torque. Thereafter, for example, by turning off the drive sources of the first, second and third drive shafts 1, 2 and 3, breakage of each transmission system can be surely prevented.

In assembling, by making the paired third wedges 119 approach each other with the bolts 120, the first and second wedges 117 and 118 are brought into pressure contact with the outer periphery of the transmission shaft 73b2 and the inner periphery of the housing 115, so that the transmission shaft 73b2 and the housing 115 are coupled firmly in the complete absence of any small gap. That is, the backlash in the rotational direction between the transmission shaft 73b2 and the second box member 66 is sure to be suppressed. In the wrist mechanism, a large backlash of each component causes a large operation error, so it is important to suppress the backlash. For example, in the case where the transmission shaft 73b2 and the second box member 66 are coupled by conventional means, namely, using key or pin, not only it is necessary to form key ways or pin holes in the transmission shaft 73b2 and the second box member 66 under actual combination, but also since the key or pin is inserted in the key ways or pin holes, there occurs a small gap between the key and the key ways or between the pin and the pin holes, thus resulting in an increased backlash between the transmission shaft 73b2 and the second box member 66 and causing a larger operation error. In this embodiment, however, the backlash in the rotational direction between the transmission shaft 73b2 and the second box member 66 is suppressed by the first, second and third wedges 117–119, so the operation accuracy of the wrist mechanism is greatly improved.

The engagement between the bevel gears 58 and 59 is adjusted before the housing 115 is mounted to the cylindrical portion 66d. By once assembling the bevel gear 58 and the bearings 54 and 126 into a single set and inserting the bevel gear 58 into the key 125, the bevel gears 58 and 59 are brought into engagement with each other. The amount of that engagement is adjusted by changing the number of the adjusting washer 130.

In adjusting the engagement, the bevel gear 58 which is now integral with the bearing box 126 is mounted from the exterior. Thereafter, the housing 115 is mounted.

In this embodiment, since the opening of the second box member has a diameter larger than the diameter of the outer peripheral portion of the above gear, the gear can be mounted from the exterior together with the bearing box, thus permitting an extremely easy adjustment of the gear engagement.

In the case where the second box member is so constructed as to permit slipping through wedge means relative to the transmission shaft and the bearing box is disposed more inside than the wedge means, not only the breakage of the transmission path can be prevented by the wedge means, but also it is possible to make a successive assembling from the exterior in the order of bearing box and then wedge means, thus permitting an easy execution of the assembling work and the adjustment of torque of the wedge means.

Figure 16:
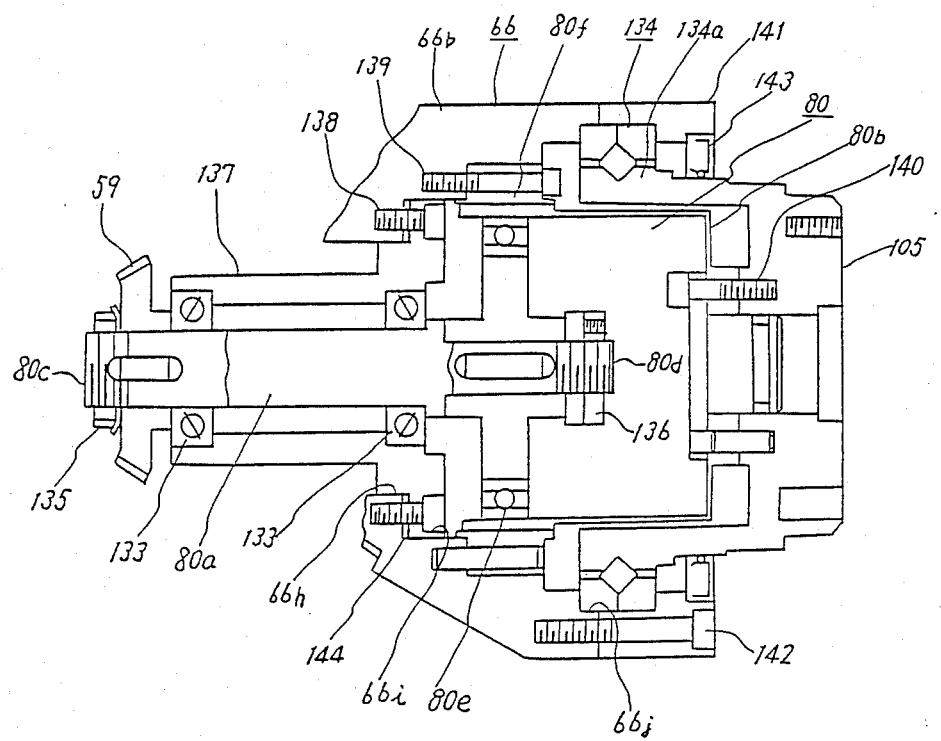

FIG. 16 is a sectional view showing a concrete structure of and around the output member in the fifth embodiment of FIG. 5. In the figure, the numeral 66h is a fitting portion which is formed in the housing 66b of the second box member 66 and which obliquely intersects the axis of rotation of the second box member 66. The fitting portion 66h is open in a diameter larger than the diameter of the outer peripheral portion of the bevel gear 59. The numerals 66i and 66j are fitting portions which are concentric with the fitting portion 66h; 80c and 80d are a pair of threaded portions formed on the input shaft 80a of the harmonic reduction unit 80; 80e is a wave generator of the harmonic reduction unit 80 which is fitted on the input shaft 80a; 80f is a circular spline fitted in the fitting portion 66i in opposed relation to the wave generator 80e; 135 is a nut for coupling the bevel gear 59 to the input shaft 80a; 136 is a nut for coupling the wave generator 80e to the input shaft 80a; and 137 is a bearing box which is fitted in the fitting portion 66h and which supports the input shaft 80a through a bearing 133, the bearing box 137 being connected to the housing 66b removably through bolts 138. The numeral 139 is a bolt for connecting the circular spline 80f to the housing 66b; 140 is a bolt for coupling the boss portion 105 and the output portion 80b; and 141 is a bearing cover for holding a bearing 134 through bolts 142 with respect to the housing 66b. An inner race 134a of the bearing 134 is constituted integrally with the boss portion 105. The numeral 143 is a shaft sealing member, and 144 is an adjusting washer for adjusting the engagement of the bevel gears 59 and 58.

For adjusting the engagement of the bevel gears 58 and 59 in such construction, first the input shaft 80, bearing 133 and bevel gear 59 are assembled together with the bearing box 137. This assembly is mounted to the housing 66b and fixed with bolts 138. In this case, a check is made on the tooth contact of the bevel gears 58 and 59, and the engagement thereof is adjusted by the adjusting washer 144. Then, the wave generator 80e is coupled to the input shaft 80a, and the circular spline 80f is coupled to the housing 66b with bolts 139. The boss portion 105 is coupled to output portion 80b through bolts 140, so the boss portion 105 is supported by the housing 66b together with the output portion 80b and further supported by the bearing cover 141. Thus, in this construction, the bevel gear 59 is mounted to the housing 66b by the bearing box 137 together with the input shaft 80a and then the harmonic reduction unit is mounted to the housing 66b.

At the time of maintenance of the harmonic reduction unit 80, it can be removed independently of the input shaft 80a and bevel gear 59 by removing the bolts 139 and 142. And even at the time of removal of the harmonic reduction unit 80, it is unnecessary to adjust the engagement of the bevel gear 59, thus facilitating the maintenance.

In this embodiment, the opening of the second box member is formed larger in diameter than the outer peripheral portion of the gear coupled to the output member out of a group of gears, and the bearing box which supports the output member is disposed in the opening. Therefore, the bevel gear can be mounted from the exterior of the second box member, so the adjusting washer can be mounted easily, and it becomes extremely easily to adjust the bevel gear engagement.

In the case where the output member is constituted by a shaft portion to one end of which is coupled a gear and which is supported rotatably by a bearing box, a harmonic reduction unit whose input side is connected removably to the other end of the shaft portion and with a fixed gear being removably coupled to the second box member, and a boss portion coupled to the output side of the harmonic reduction unit and supported rotatably by the second box member, it is possible to remove the harmonic reduction unit independently of the gear supported by the bearing box at the time of maintenance of the harmonic reduction unit, and it is not necessary to readjust the gear engagement, thus permitting an extremely easy maintenance.

Although in the above embodiments explanations have been made about the construction in which the axis of rotation of the second box member obliquely intersects the axis of rotation of the first box member, and the output member obliquely intersects the axis of rotation of the second box member, there can be attained similar effects also in the case of a construction in which both intersect perpendicularly.

According to the present invention, as set forth hereinabove, a concentric triple shaft is constituted by a first drive shaft, a cylindrical, second drive shaft which concentrically encloses the first drive shaft, and a cylindrical, and a third drive shaft which concentrically encloses the second drive shaft, and there are provided a first box member capable of rotating concentrically with the third drive shaft, a second box member which is supported rotatably by the first box member on an axis intersecting the axis of rotation of the first box member perpendicularly or obliquely, and an output member which is supported rotatably by the second box member on an axis intersecting the axis of rotation of the second box member perpendicularly or obliquely and which is rotated by the first drive shaft, and a harmonic reduction unit is disposed in at least one of the transmission systems of power to the first and second box members and the output member, whereby the number of components of the power transmission systems can be reduced and the backlash in the rotational direction of the first and second box members and the output member can be diminished, thus permitting improvement of the operation accuracy of the output member.

In the present invention, moreover, a concentric triple shaft is constituted by a first drive shaft, a cylindrical, second drive shaft which concentrically encloses the first dirve shaft and a cylindrical, and a third drive shaft which concentrically encloses the second drive shaft, and there are provided a first box member capable of rotating concentrically with the third drive shaft, a second box member which is supported rotatably by the first box member about an axis intersecting the axis of rotation of the first box member perpendicularly or obliquely, an output member which is supported rotatably by the second box member about an axis intersecting the axis of rotation of the second box member perpendicularly or obliquely and which is rotated by the first drive shaft, and a bearing box which is disposed over the outer periphery of a gear of a gear group constituting transmission systems of power to the first and second box members and the output member and which is mounted in an opening formed in the box members, the diameter of said opening being larger than that of the outer peripheral portion of said gear; consequently, it becomes easy to perform the gear adjusting operation.

INDUSTRIAL UTILIZABILITY

The present invention is applicable to industrial robots such as, for example, robots for arc welding and robots for assembling work, particularly to their wrist devices.

What is claimed is:

1. A wrist device of an industrial robot, having a first drive shaft; a second drive shaft which concentrically encloses the first drive shaft; a third drive shaft which concentrically encloses the second drive shaft; a first box member connected to the third drive shaft and capable of rotating concentrically with the third drive shaft; a second box member which is supported rotatably by the first box member about an axis intersecting the axis of rotation of the first box member perpendicularly or obliquely; an output member which is supported rotatably by the second box member about an axis intersecting the axis of rotation of the second box member perpendicularly or obliquely and which is rotated by the first drive shaft; and a first bearing box which is disposed over the outer periphery of a gear of a first gear group constituting transmission systems of power to the second box member and the output member and which is mounted within an opening formed in the first box member, said opening being larger in diameter than the outer peripheral portion of said gear; a transmission shaft which is supported at one end thereof by said first box member and which intersects said third drive shaft perpendicularly or obliquely; said first gear group transmitting the rotation of the second shaft to said transmission shaft; said second box member being supported by the first box member rotatably at one end thereof and being open at the other end; a housing connected to both the opening at the other end of the second box member and said transmission shaft; said output member being supported rotatably by the second box member and intersecting the axis of said transmission shaft perpendicularly or obliquely; and a hollow shaft which is concentrically disposed outside said transmission shaft and which transmits the rotation of said first drive shaft to said output member through a second gear group, a bearing disposed over a gear of said second gear group, said gear of said second gear group being coupled to said hollow shaft, and a second bearing box supporting said bearing and mounted within the opening formed at the other end of said second box member, said opening being larger in diameter than the outer peripheral portion of said gear of said second gear group.

2. A wrist device of an industrial robot as set forth in claim 1, having said second box member which is supported rotatably by the first box member and which is open at both ends thereof; and a wedge means which is disposed between the inner periphery of said housing and the outer periphery of said transmission shaft and which causes the second box member to slip relative to said transmission shaft only when an overload is applied to the transmission shaft.

3. A wrist device of an industrial robot, having a first drive shaft; a second drive shaft which concentrically encloses the first drive shaft; a third drive shaft which concentrically encloses the second drive shaft; a first box member connected to the third drive shaft and capable of rotating concentrically with the third drive shaft; a second box member which is supported rotatably by the first box member about an axis intersecting the axis of rotation of the first box member perpendicularly or obliquely; an output member which is supported rotatably by the second box member about an axis intersecting the axis of rotation of the second box member perpendicularly or obliquely and which is rotated by the first drive shaft; and a first bearing box which is disposed over the outer periphery of a gear of a first gear group constituting transmission systems of power to the second box member and the output member and which is mounted within an opening formed in the first box member, said opening being larger in diameter than the outer peripheral portion of said gear; a transmission shaft which is supported by the first box member at one end thereof and which intersects the third drive shaft perpendicularly or obliquely; said first gear group transmitting the rotational force of the second drive shaft to said transmission shaft; said second box member supported rotatably by the first box member, having an opening along the axis which intersects the axis of rotation of the first box member, and coupled to said transmission shaft; a second bearing box removably fitted in the opening of the second box member; said output member being supported rotatably by said second bearing box and intersecting the axis of said transmission shaft perpendicularly or obliquely; and a hollow shaft which is concentrically disposed outside said transmission shaft and which transmits the rotation of the first drive shaft to said output member through a second gear group, said opening of said second box member being larger in diameter than the outer peripheral portion of a gear which is coupled to said output member.

4. An industrial robot wrist device as set forth in claim 3, wherein said output member comprises a shaft portion to one end of which is coupled said gear and which is supported rotatably by said second bearing box; a harmonic reduction unit having an input side coupled to said shaft portion removably and a fixed gear coupled removably to said second box member; and a boss portion coupled to an output side of said harmonic reduction unit and supported rotatably by said second box member.

* * * * *